(12) United States Patent
Yang et al.

(10) Patent No.: US 11,362,530 B2
(45) Date of Patent: Jun. 14, 2022

(54) CONICAL WIRELESS CHARGING STATION

(71) Applicant: Intel Corporation, Santa Clara, CA (US)

(72) Inventors: Songnan Yang, San Jose, CA (US); Hong W. Wong, Portland, OR (US); David Zhou, Shanghai (CN); Wah Yiu Kwong, Beaverton, OR (US); Xiaoguo Liang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 16/087,978

(22) PCT Filed: Mar. 24, 2016

(86) PCT No.: PCT/CN2016/077212
§ 371 (c)(1),
(2) Date: Sep. 24, 2018

(87) PCT Pub. No.: WO2017/161531
PCT Pub. Date: Sep. 28, 2017

(65) Prior Publication Data
US 2019/0109474 A1    Apr. 11, 2019

(51) Int. Cl.
*H02J 7/00* (2006.01)
*H02J 7/02* (2016.01)
*H02J 50/10* (2016.01)

(52) U.S. Cl.
CPC .......... *H02J 7/0044* (2013.01); *H02J 7/0027* (2013.01); *H02J 7/0047* (2013.01); *H02J 7/025* (2013.01); *H02J 50/10* (2016.02)

(58) Field of Classification Search
CPC ........ H02J 7/0044; H02J 7/025; H02J 7/0047; H02J 7/0027; H02J 7/00; H02J 7/02; H02J 50/10
(Continued)

(56) References Cited

U.S. PATENT DOCUMENTS 1,780,130 A * 10/1930 William .................. F02M 29/08
48/189.4
6,404,089 B1 * 6/2002 Tomion ................. B64C 39/001
244/23 A (Continued)

FOREIGN PATENT DOCUMENTS

| CN | 203456923 U | 2/2014 |
| CN | 104868552 A | 8/2015 |

(Continued)

OTHER PUBLICATIONS

International Search Report and Written Opinion for International Patent Application No. PCT/CN2016/077212, dated Dec. 27, 2016, 12 pages.

*Primary Examiner* — Richard Isla
*Assistant Examiner* — Dung V Bui
(74) *Attorney, Agent, or Firm* — Jordan IP Law, LLC

(57) ABSTRACT

Systems, apparatuses and methods may provide for a wireless charging system that includes a charge circuit and a housing configuration having a substantially conical outer profile. Additionally, one or more charge coils may be positioned within the housing configuration and coupled to the charge circuit, wherein the one or more charge coils define a charge field direction that is perpendicular to the substantially conical outer profile. In one example, the housing configuration includes a plurality of segments arranged in a stacked configuration.

21 Claims, 10 Drawing Sheets

(58) Field of Classification Search
USPC .......................................................... 320/108
See application file for complete search history.

(56) References Cited

U.S. PATENT DOCUMENTS

| | | | | |
|---|---|---|---|---|
| 9,161,430 | B1* | 10/2015 | Bahr | .......................... G01T 3/00 |
| 2006/0113956 | A1* | 6/2006 | Bublitz | ................. H02J 7/0042 |
| | | | | 320/112 |
| 2007/0194651 | A1* | 8/2007 | Rayner | .............. H02K 15/0006 |
| | | | | 310/191 |
| 2009/0096414 | A1* | 4/2009 | Cheng | ..................... H02J 5/005 |
| | | | | 320/108 |
| 2009/0206791 | A1* | 8/2009 | Jung | ........................ H02J 50/80 |
| | | | | 320/108 |
| 2011/0115429 | A1* | 5/2011 | Toivola | ................... H01F 38/14 |
| | | | | 320/108 |
| 2012/0169279 | A1* | 7/2012 | Kim | .......................... H02J 7/04 |
| | | | | 320/108 |
| 2014/0184151 | A1* | 7/2014 | Han | .................... H01F 27/2804 |
| | | | | 320/108 |
| 2014/0364173 | A1 | 12/2014 | Tuli | |
| 2015/0364244 | A1* | 12/2015 | Tsai | ...................... H01F 27/365 |
| | | | | 336/200 |

FOREIGN PATENT DOCUMENTS

| | | | | |
|---|---|---|---|---|
| CN | 105245019 | A | | 1/2016 |
| CN | 105264737 | A | | 1/2016 |
| GB | 2282715 | A | | 4/1995 |
| GB | 2531507 | A | * 4/2016 | ............ H02J 7/0044 |

\* cited by examiner

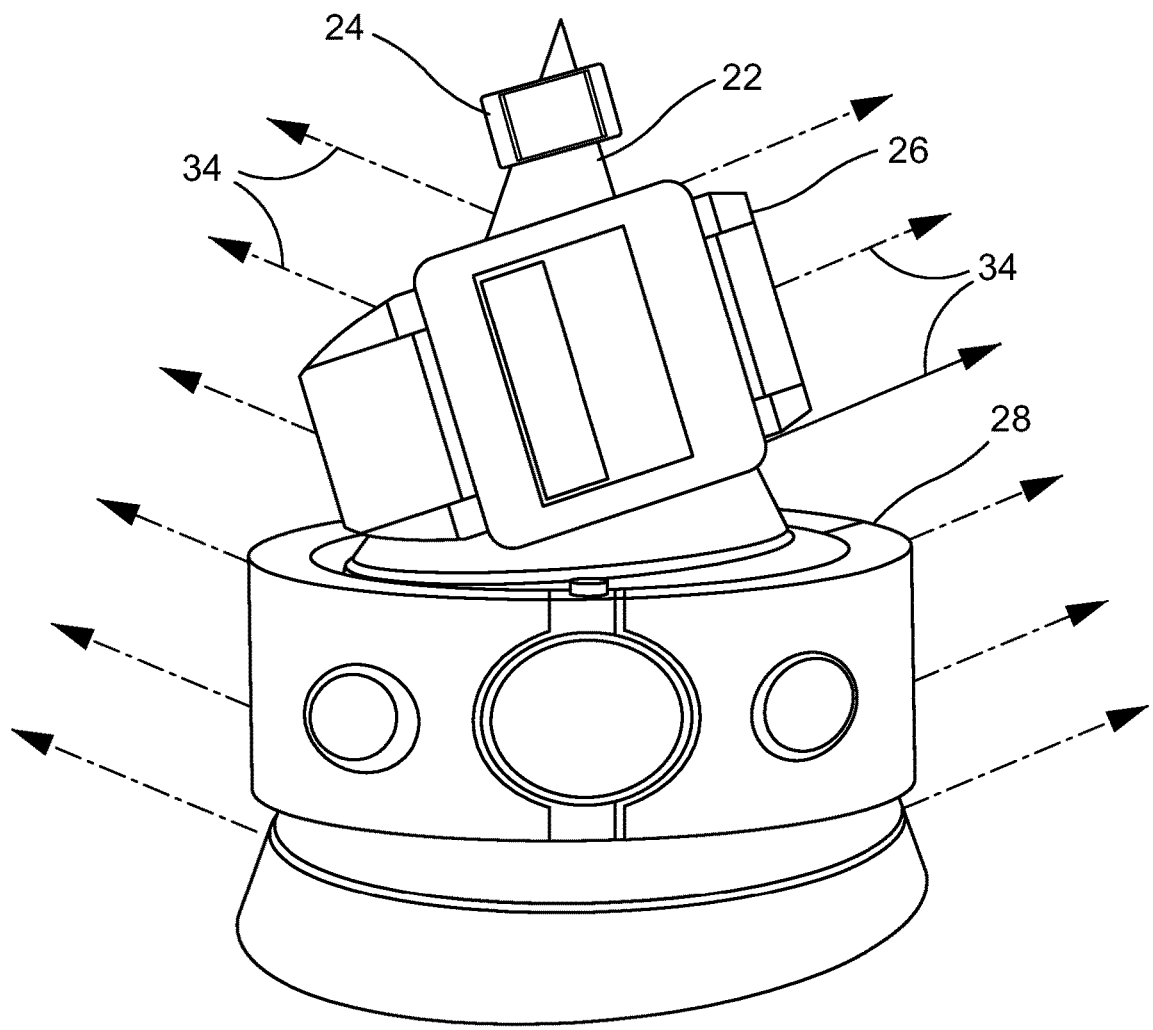
FIG. 2A
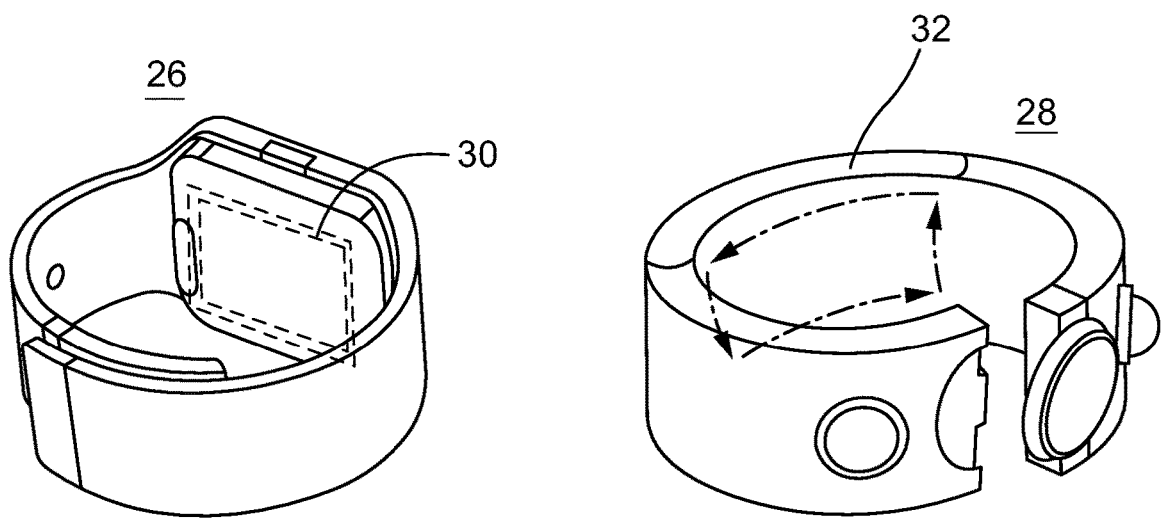
FIG. 2B
FIG. 2C

CONICAL WIRELESS CHARGING STATION

CROSS REFERENCE TO RELATED APPLICATIONS

This application is a U.S. National Phase Patent Application which claims benefit to International Patent Application No. PCT/CN2016/077212 filed on Mar. 24, 2016.

TECHNICAL FIELD

Embodiments generally relate to wireless charging stations. More particularly, embodiments relate to conical wireless charging stations that charge mobile devices.

BACKGROUND

Wearable devices may have a variety of different form factors such as smart eyewear, watches, jewelry, and so forth, wherein the mobile nature of the wearable devices may call for battery powered operation. Battery charging may involve the use of wireless charging systems that are incorporated into pads having a generally planar shape. The charging pads, however, may occupy a considerable amount of physical space in the surrounding area (e.g., on a table or desktop). Moreover, wireless charging efficiency may be dependent on the orientation of the wearable device relative to the charger. In this regard, traditional wireless charging pads may provide suboptimal charging efficiency due to the form factors of certain wearable devices. For example, smart eyewear might encircle the lenses of the eyewear with charge receiving coils so that in order to optimize charge efficiency, the eyewear would be laid down on the pad in a position that may damage the lenses. Indeed, watches having charge receiving coils along the back of the watch housing may be unable to achieve optimal charging efficiency due to the curved form factor of the watch.

BRIEF DESCRIPTION OF THE DRAWINGS

The various advantages of the embodiments will become apparent to one skilled in the art by reading the following specification and appended claims, and by referencing the following drawings, in which:

FIG. 2A is an illustration of an example of a conical wireless charging system during the concurrent charging of a smart ring, a smart watch and a smart bracelet according to an embodiment;

FIGS. 2B and 2C are illustrations of examples of charge receiving coil configurations for a smart watch and a smart bracelet, respectively, according to embodiments;

DESCRIPTION OF EMBODIMENTS

Figure 1:
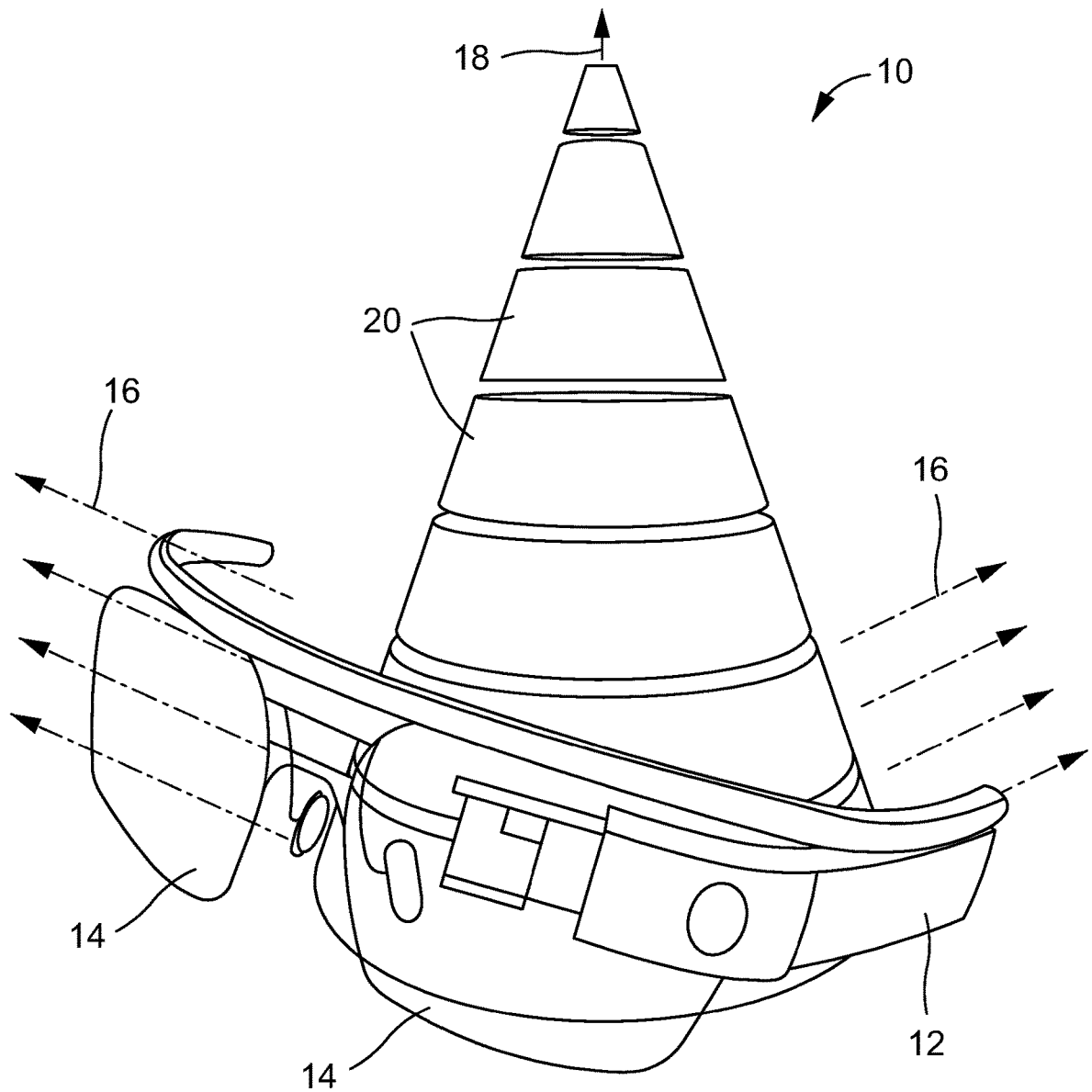
FIG. 1 is an illustration of an example of a conical wireless charging system during the charging of smart eyewear according to an embodiment.

Turning now to FIG. 1, a wireless charging system 10 (e.g., wireless charger/charging station) is shown in which a housing configuration of the charging system 10 includes a substantially conical outer profile. The wireless charging system 10 may generally be used to charge and/or re-charge the batteries of mobile devices such as, for example, smart eyewear 12 (e.g., glasses) and/or other wearable devices (not shown). In general, the charging efficiency of the system 10 may be dependent on the orientation of the mobile devices relative to the system 10. For example, the lenses 14 of the eyewear 12 may be encircled with charge receiving coils (e.g., embedded in the frames), wherein optimal charging efficiency may be achieved when a magnetic field passes in a direction that is substantially normal/perpendicular to a plane containing the lenses 14. As will be discussed in greater detail, one or more charge coils may be positioned within the housing configuration of the system 10 in a manner that directs a charge field 16 laterally to a longitudinal axis 18 of the substantially conical outer profile (e.g., substantially perpendicular to the conical outer profile). As a result, the illustrated system 10 optimizes charge efficiency without the eyewear 12 being laid down in a position that may damage the lenses 14. The housing configuration may also include a plurality of segments 20 arranged in a stacked configuration.

FIGS. 2A-2C show an example in which a conical wireless charging system 22 concurrently charges a smart ring 24, a smart watch 26 and a smart bracelet 28. As best shown in FIG. 2B, a charge receiving coil may be positioned along a region 30 along the back of the watch 26. Similarly, as best shown in FIG. 2C, a charge receiving coil may be positioned along a region 32 along the back of the bracelet 28. Accordingly, generating a charge field 34 that is directed substantially perpendicular to the conical wireless charging system 22 enables the watch 26 and the bracelet 28 to be charged more efficiently and/or quickly even though the wearable devices have a curved shape. Moreover, the conical shape of the system 22 substantially reduces the physical footprint of the system 22 relative to a conventional charging pad large enough to charge the same number and size of wearable devices. The illustrated charging system 22 also enhances the ability of a user to view notifications and other information on the displays of the wearable devices during charging. For example, the displays of the smart ring 24 and the smart watch 26 are elevated (e.g., from a table or desktop), angled, and simultaneously visible in the illustrated example.

The charging system 22 may also be magnetized to facilitate alignment of the devices being charged with the outer profile. For example, the magnetic force may pull the region 30 of the watch 26 and/or the region 32 of the bracelet 28 toward the external surface of the system 22, wherein such an approach may further improve charging efficiency. The magnetization may be achieved in a number of different ways, depending on the circumstances. For example, electromagnets and/or permanent magnets might be positioned at particular locations around the conical profile of the system 22, wherein corresponding metallic surfaces and/or magnets may also be positioned in or around the regions 30, 32. Other solutions may also be used.

Figure 3A:
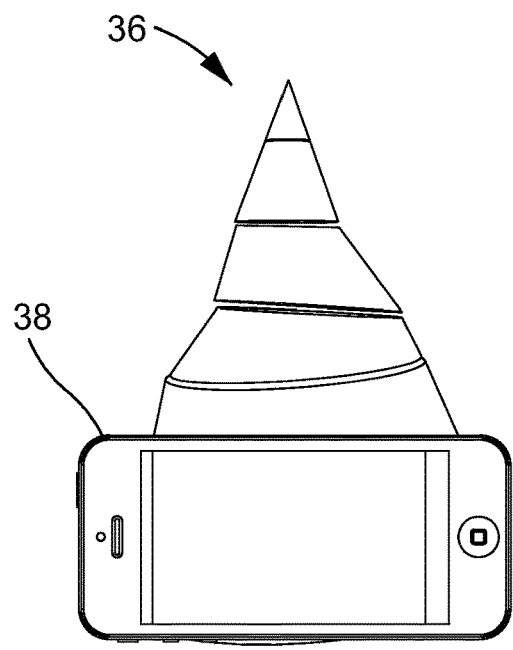
FIGS. 3A-3C are illustrations of examples of a conical wireless charging system during the charging of a smart phone in various positions according to embodiments.
Figure 3B:
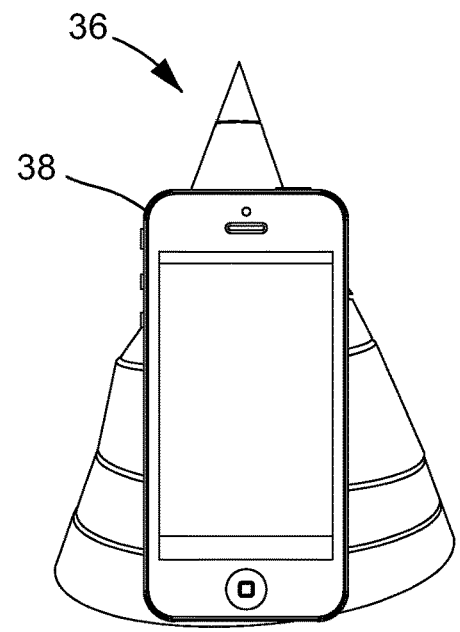
Figure 3C:
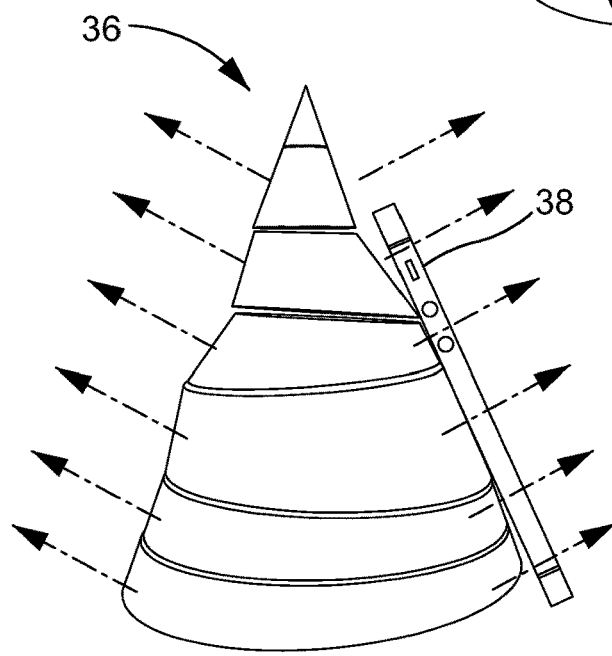

FIGS. 3A-3C demonstrate that a conical wireless charging system 36 may also be used to charge a smart phone 38 in a variety of different positions. For example, FIG. 3A shows the smart phone 38 being charged in a landscape position, whereas FIGS. 3B and 3C show the smart phone 38 being charged in a portrait position. In each instance, the display of the smart phone 38 is facing outward and visible to the user during charging. Accordingly, the illustrated system 36 also enhances the ability of the user to view notifications and other information on the display of the smart phone 38 during charging.

Figure 4A:
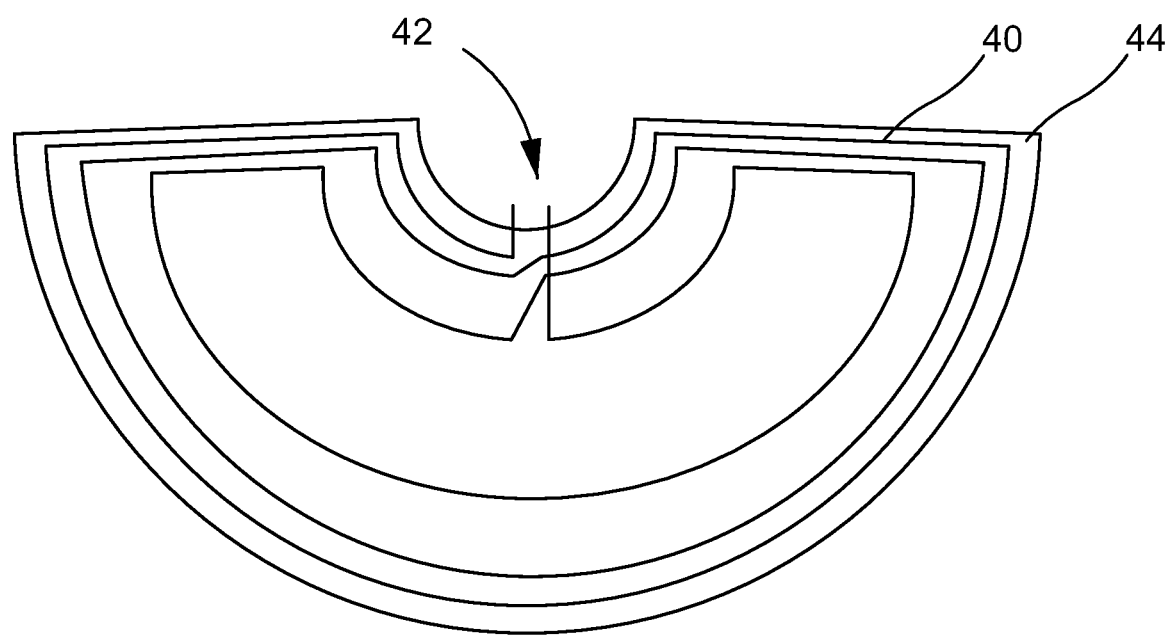
FIG. 4A is a plan view of an example of a planar charge coil according to an embodiment.

Turning now to FIG. 4A, a charge coil 40 is shown in a planar configuration. The charge coil 40 may generally include a feed point 42 to be electrically coupled to a charge circuit (not shown). Additionally, the charge coil 40 may be mounted to a flexible substrate 44 (e.g., flexible printed circuit board/PCB) in a winding pattern.

Figure 4B:
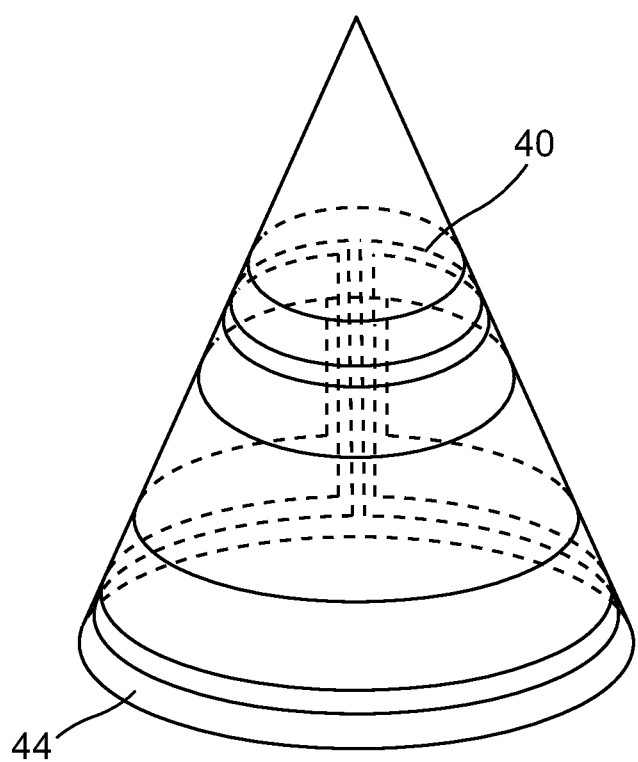
FIG. 4B is a perspective view of an example of the charge coil from FIG. 4A formed into a substantially conical shape according to an embodiment.

FIG. 4B demonstrates that the flexible substrate 44 and the charge coil 40 may be formed into a substantially conical shape. Accordingly, the illustrated charge coil 40 conforms to the conical housing configuration and defines a charge field direction that is perpendicular to the conical shape. Moreover, the spacing of the winding pattern may be established so that the generated magnetic field is uniform.

Figure 5A:
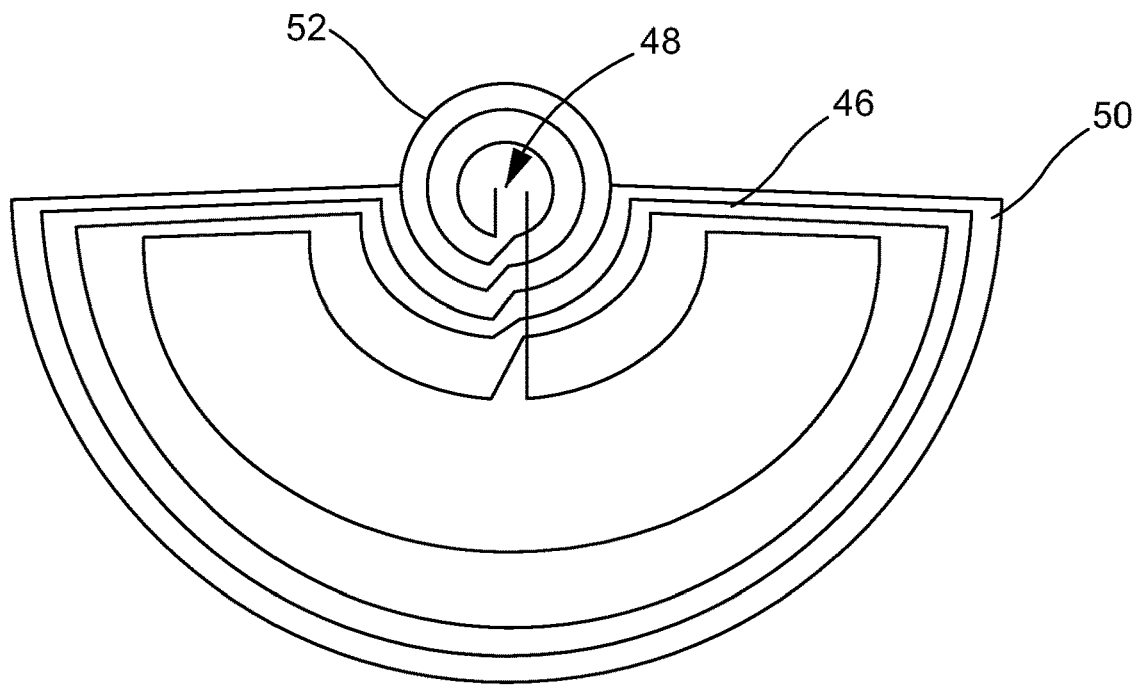
FIG. 5A is a plan view of an example of a planar charge coil defining both lateral and longitudinal charge field directions according to an embodiment.

Turning now to FIG. 5A, a charge coil 46 is shown in a planar configuration. The charge coil 46 may generally include a feed point 48 to be electrically coupled to a charge circuit (not shown). Additionally, the charge coil 46 may be mounted to a flexible substrate 50 (e.g., flexible PCB) in a winding pattern. With continued reference to FIGS. 5A and 5B, the charge coil 46 may also include a subsection 52, which when the charge coil 46 is formed into a substantially conical shape, remains in the substantially planar configuration. Accordingly, the subsection 52 may define a charge field 54 having a direction that is parallel to a longitudinal axis 58 of the conical shape, while the remaining portion of the charge coil 46 defines a charge field 56 having a direction that is generally lateral to the longitudinal axis 58 of the conical shape (e.g., substantially perpendicular to the conical shape).

Figure 5B:
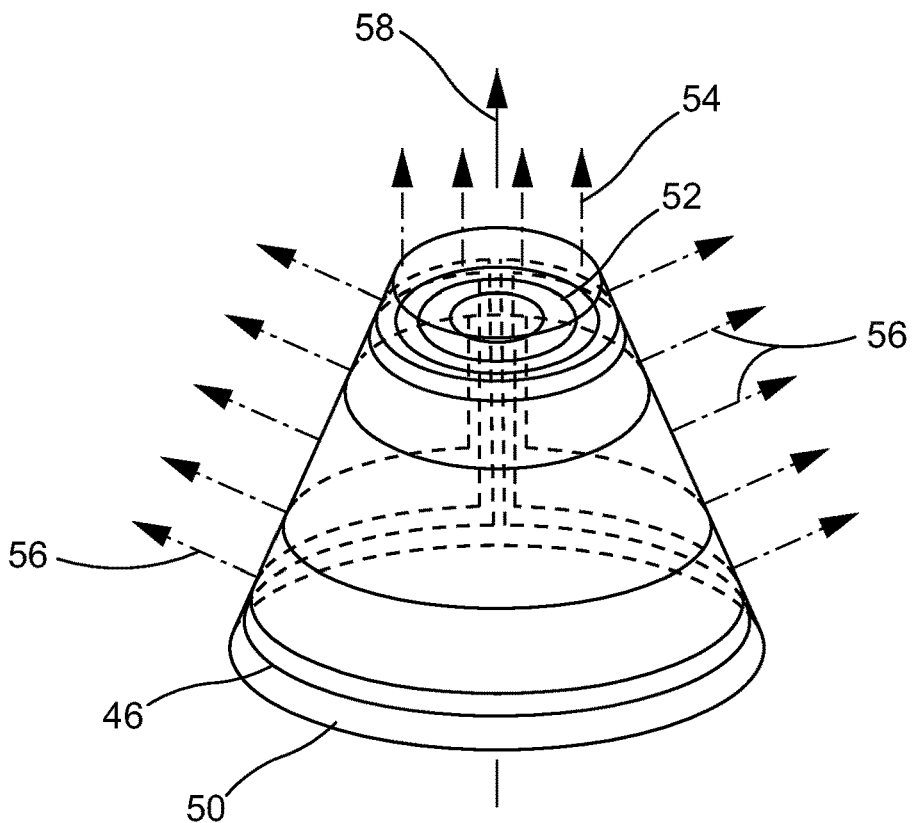
FIG. 5B is a perspective view of an example of the charge coil from FIG. 5A formed into a substantially conical shape according to an embodiment.
Figure 5C:
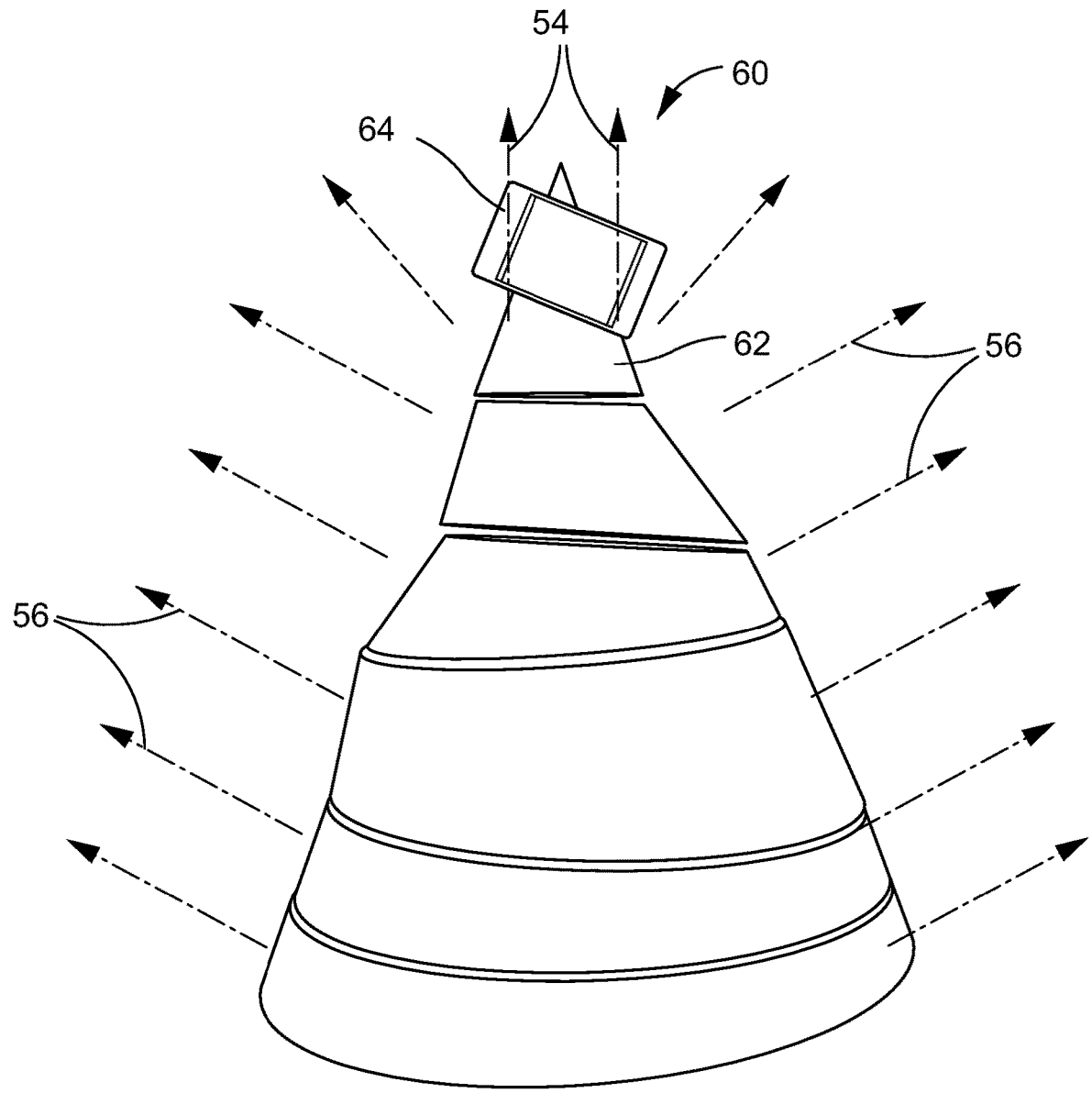
FIG. 5C is an illustration of an example of a conical wireless charging system having a segment with the charge coil of FIGS. 5A and 5B according to an embodiment.

With continuing reference to FIGS. 5A-5C the charge coil 46 may be incorporated into a segment 62 of a wireless charging system 60 so that the longitudinal charge field 54 magnetically couples with a smart ring 64 placed on the system 60. The smart ring 64 may include a receiving coil (not shown) that is positioned around a perimeter of the ring 64 (e.g., in contrast to a watch or bracelet having bands/clasps that open). Accordingly, optimal charging of the ring 64 may be achieved when a magnetic field passes in a direction that is substantially normal to a plane containing the opening of the ring 64. The illustrated charge field 54 therefore substantially improves the charging efficiency and/or speed of the smart ring 64.

Figure 6A:
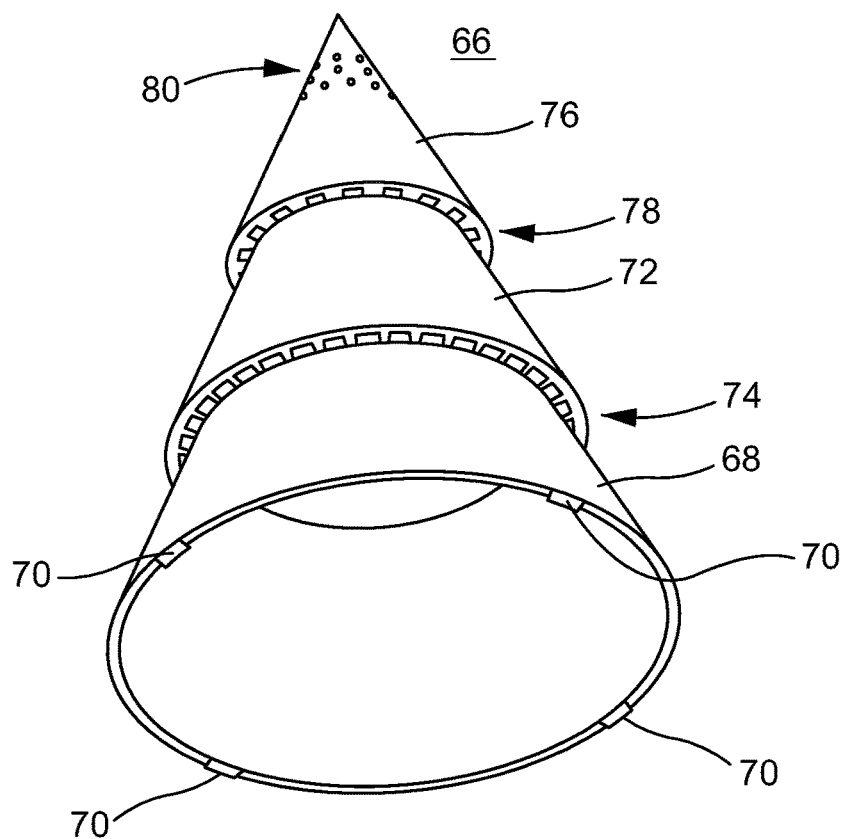
FIGS. 6A and 6B are perspective views of examples of a conical wireless charging system having segments with inlet passages and outlet passages according to an embodiment.
Figure 6B:
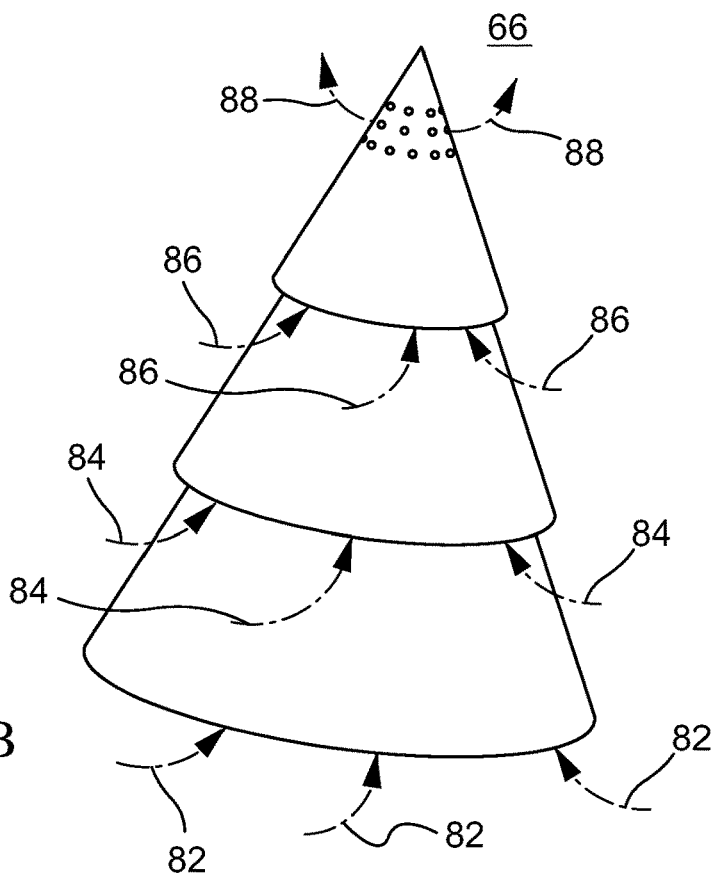

Turning now to FIGS. 6A and 6B, a wireless charging system 66 is shown with an enhanced passive cooling thermal design. In this regard, during operation, the charge coils of the system 66 may generate heat. In the illustrated example, a largest segment 68 includes a plurality of feet 70, an intermediate segment 72 includes surfaces defining a plurality of inlet passages 74 and a smallest end segment 76 includes surfaces defining a plurality of inlet passages 78. Additionally, the smallest end segment 76 may include surfaces defining a plurality of outlet passages 80. Accordingly, the feet 70 may provide a clearance for inlet airflow 82, the inlet passages 74 may enable inlet airflow 84 and the inlet passages 78 may enable inlet airflow 86. Moreover, exhaust airflow 88 may exit the system 66 through the outlet passages 80 due to natural convection.

Thus, the lower temperature ambient air may be entrained by the hotter air in the system 66 through the inlet passages 74, 78 and the clearance provided by the feet 70. The entrained ambient airflow may then cool the walls of the segments 68, 72, 76 as well as the heat generating components (e.g., power transmission board of the charge circuit). The entrained ambient airflow therefore lowers the temperature of the air within the system 66 by mixing with it.

Figure 7A:
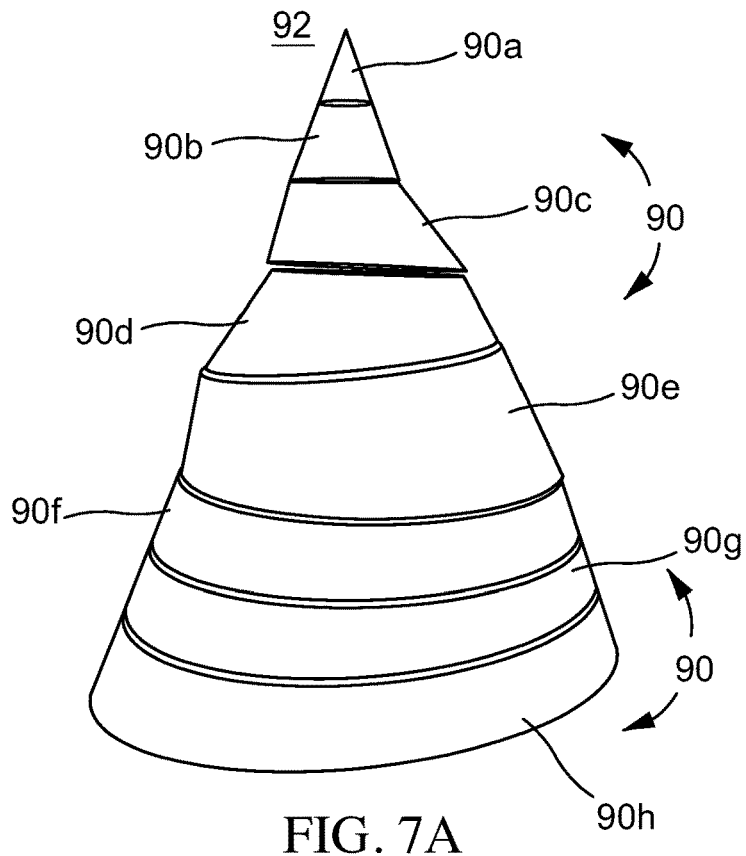
FIG. 7A-7C are illustrations of examples of a conical wireless charging system having segments with asymmetrical outer profiles that differ from one another according to an embodiment.
Figure 7B:
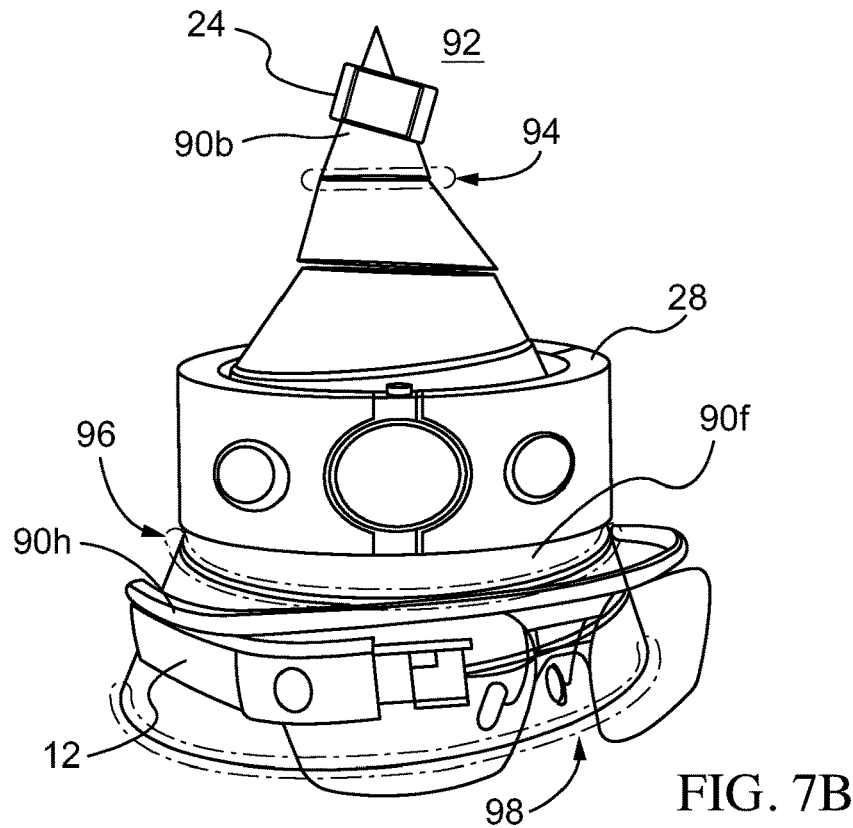
Figure 7C:
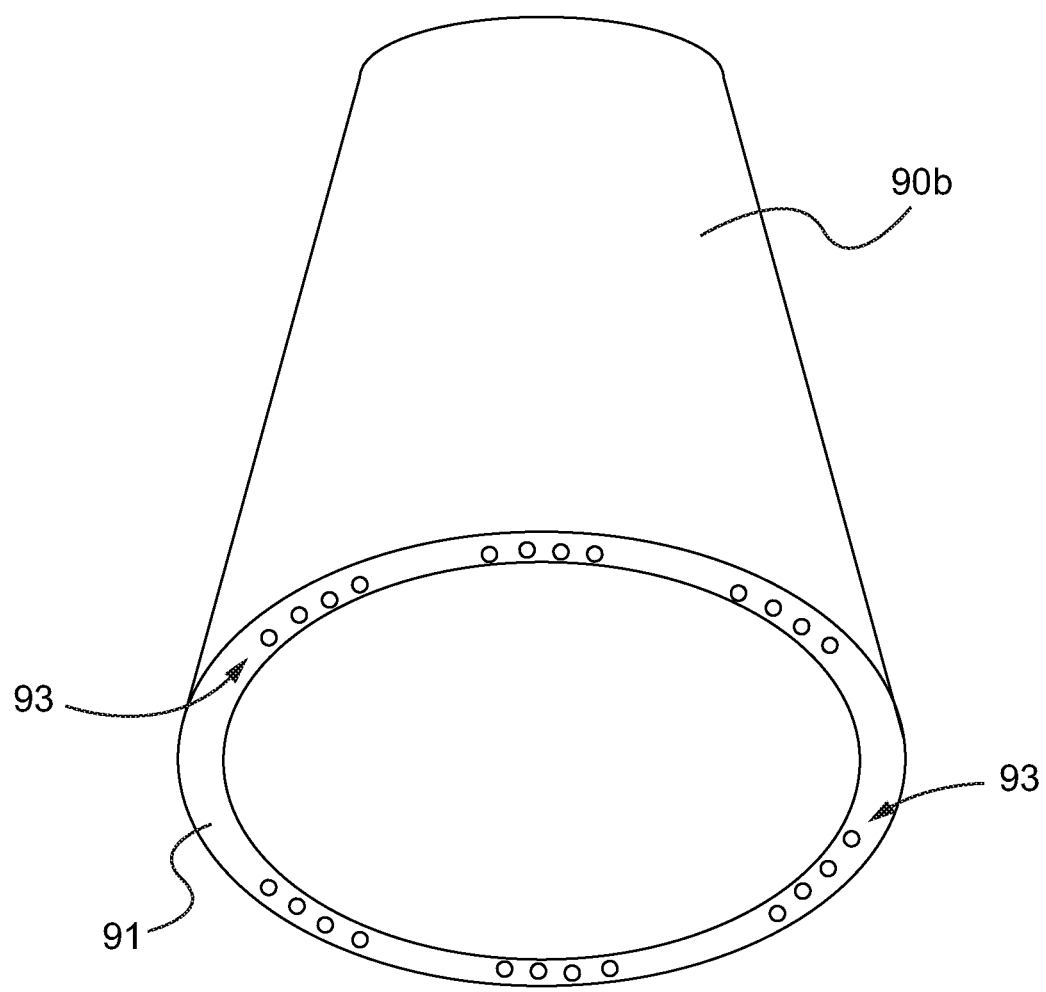

FIGS. 7A-7C demonstrate that a wireless charging system 92 may include a housing configuration having a plurality of segments 90 (90a-90h) with outer profiles that differ from one another. For example, a first segment 90a and a second segment 90a may include outer profiles that are relatively symmetrical, whereas a third segment 90c, a fourth segment 90d and a fifth segment 90e may include outer profiles that are relatively asymmetrical. The irregular and offset arrangement of the stacked segments 90 may ease placement of devices having different diameters. For example, the differing outer profiles of the third segment 90c and the fourth segment 90d may result in a smart watch such as, for example, the smart watch 26 (FIG. 2A) being tilted to provide more clearance for the smart bracelet 28 to be added to the system 92 after the smart watch 26 (FIG. 2A) is added. Similarly, the smart bracelet 28 may be removed from the system 92 before the smart watch 26 (FIG. 2A) is removed. Thus, the illustrated example may enable wearable devices to be added to the system 92 in any order (e.g., rather than largest to the smallest).

The illustrated wireless charging system 92 also provides a unique solution to indicating the charging status of the wearable devices. In this regard, each segment 90 may include a first rim (e.g., top rim), a second rim (e.g., bottom rim) that is larger than the first rim and a charge status indicator positioned along the perimeter of the second rim. The charge status indicator may generally include an LED (light emitting diode) array or other light-generation system. In the illustrated example best shown in FIG. 7C, the bottom rim 91 of the second segment 90b includes charge status indicators 93 that output light 94 of a particular color (e.g., blue for charging) to indicate the status of the smart ring 24. Similarly, the bottom rim of a sixth segment 90f outputs light 96 of another color (e.g., green for fully charged) to indicate the status of the smart bracelet 28, an eighth segment 90h outputs light 98 of a particular color (e.g., blue for charging) to indicate the status of the smart eyewear 12, and so forth. In one example, each segment 90 can illuminate a color that corresponds with the charge status of the device being charged. For instance, blue may indicate that the item is charging while green might indicate that the device is fully charged. In other embodiments, the charge status indicator may be positioned elsewhere on each segment 90, for example along the perimeter of the first rim (e.g., top rim) or along the perimeter surrounding the middle portion of the segment between the top rim and the bottom rim.

Figure 8:
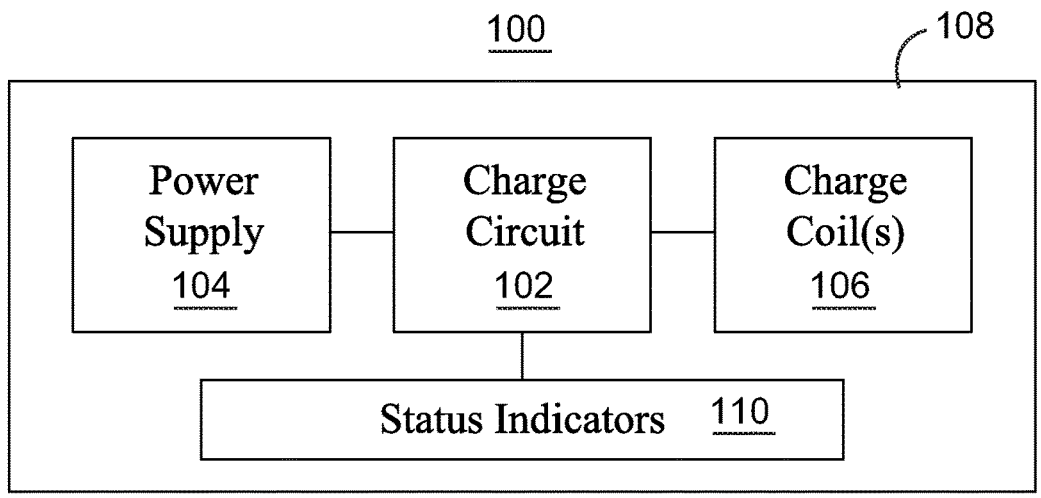
FIG. 8 is a block diagram of a wireless charging system according to an embodiment.

FIG. 8 shows a wireless charging system 100 that includes a charge circuit 102 coupled to a power supply 104 and one or more charge coils 106. As already noted, the system 100 may include a housing configuration 108 having a substantially conical outer profile. Moreover, the charge coils 106 may define a charge field direction that is perpendicular to the substantially conical outer profile. In one example, the charge circuit 102 also controls one or more status indicators 110 positioned along the perimeter of one or more segment rims.

Figure 9:
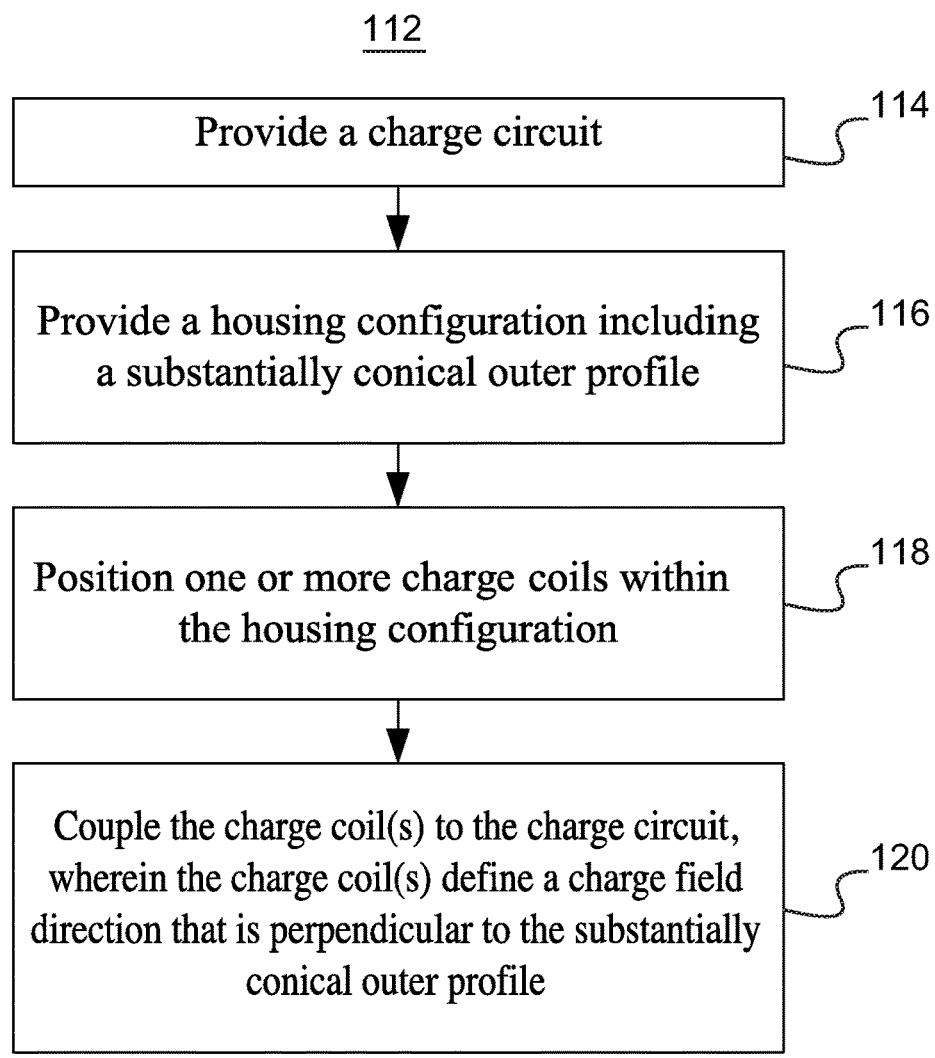
FIG. 9 is a flowchart of an example of a method of manufacturing a wireless charging system according to an embodiment.

FIG. 9 shows a method 112 of manufacturing a wireless charging system. The method 112 may generally be used to manufacture systems such as, for example, the system 10 (FIG. 1), the system 22 (FIG. 2A), the system 36 (FIGS. 3A-3C), the system 60 (FIG. 5C), the system 66 (FIGS. 6A and 6B) and/or the system 92 (FIGS. 7A and 7B), already discussed. More particularly, the method 112 may be implemented using one or more well-documented manufacturing technologies such as, for example, plastics forming, casting, metal stamping (e.g., progressive draw, deep draw), molding, assembly, and so forth. Illustrated processing block 114 provides a charge circuit. Block 114 may include assembling and/or obtaining converters, controllers (e.g., charge and/or mode), switches, power supplies, etc., in order to establish an appropriate power conversion unit/subsystem.

Additionally, block 116 may provide a housing configuration including a substantially conical outer profile. In one example, block 116 includes arranging a plurality of segments in a stacked configuration. The stacking may be achieved by varying the inner diameters of the segments, applying adhesives, forming mating surfaces on adjacent segments, etc., or any combination thereof. Moreover, block 116 may include forming two or more of the segments with outer profiles that differ from one another. Block 116 may also form two or more of the plurality of segments with asymmetrical outer profiles. If passive cooling is used, block 116 might form at least one of the plurality of segments with surfaces defining one or more inlet passages and form a smallest end segment with surfaces defining one or more outlet passages. In addition, block 116 may further including positioning charge status indicators along, for example, perimeters of bottom rims of the segments.

Illustrated block 118 positions one or more charging coils within the housing configuration. In one example, block 118 includes coupling one or more flexible substrates to one or more charge coils and forming the one or more flexible substrates into a substantially conical shape. Moreover, block 118 may including providing at least one of the plurality of segments with a substantially planar charge coil that defines a charge field direction that is parallel to the longitudinal axis of the substantially conical outer profile. Additionally, the one or more charge coils may be coupled (e.g., via feed point connections) at block 120 to the charge circuit, wherein the one or more charge coils define a charge field direction that is perpendicular to the substantially conical outer profile. The order of operations in the method 112 may vary depending on the circumstances.

ADDITIONAL NOTES AND EXAMPLES

Example 1 may include a wireless charging system comprising a charge circuit, a housing configuration including a substantially conical outer profile and a plurality of segments arranged in a stacked configuration, wherein two or more of the plurality of segments include asymmetrical outer profiles that differ from one another, and one or more charge coils positioned within the housing configuration and coupled to the charge circuit, the one or more charge coils defining a charge field direction that is perpendicular to the substantially conical outer profile, wherein at least one of the plurality of segments includes a substantially planar charge coil defining a charge field direction that is parallel to a longitudinal axis of the substantially conical outer profile.

Example 2 may include the system of Example 1, wherein at least one of the plurality of segments includes surfaces defining one or more inlet passages.

Example 3 may include the system of Example 2, wherein the plurality of segments includes a smallest end segment having surfaces defining one or more outlet passages.

Example 4 may include the system of Example 1, wherein one or more of the plurality of segments includes a first rim, a second rim that is larger than the first rim, and a charge status indicator positioned along a perimeter of one or more of the second rim, the first rim or a middle portion between the first rim and the second rim.

Example 5 may include the system of any one of Examples 1 to 4, further including one or more flexible substrates coupled to the one or more charge coils, wherein the one or more flexible substrates have a substantially conical shape.

Example 6 may include a wireless charging system comprising a charge circuit, a housing configuration including a substantially conical outer profile, and one or more charge coils positioned within the housing configuration and coupled to the charge circuit, the one or more charge coil defining a charge field direction that is perpendicular to the substantially conical outer profile.

Example 7 may include the system of Example 6, wherein the housing configuration includes a plurality of segments arranged in a stacked configuration.

Example 8 may include the system of Example 7, wherein two or more of the plurality of segments include outer profiles that differ from one another.

Example 9 may include the system of Example 7, wherein two or more of the plurality of segments include asymmetrical outer profiles.

Example 10 may include the system of Example 7, wherein at least one of the plurality of segments includes a substantially planar charge coil defining a charge field direction that is parallel to a longitudinal axis of the substantially conical outer profile.

Example 11 may include the system of Example 7, wherein at least one of the plurality of segments includes surfaces defining one or more inlet passages.

Example 12 may include the system of Example 11, wherein the plurality of segments includes a smallest end segment having surfaces defining one or more outlet passages.

Example 13 may include the system of Example 7, wherein one or more of the plurality of segments includes a first rim, a second rim that is larger than the first rim, and a charge status indicator positioned along a perimeter of one or more of the second rim, the first rim or a middle portion between the first rim and the second rim.

Example 14 may include the system of any one of Examples 6 to 13, further including one or more flexible substrates coupled to the one or more charge coils, wherein the one or more flexible substrates have a substantially conical shape.

Example 15 may include a method of fabricating a wireless charging system comprising providing a charge circuit, providing a housing configuration including a substantially conical outer profile, positioning one or more charge coils within the housing configuration, and coupling the one or more charge coils to the charge circuit, wherein the one or more charge coils define a charge field direction that is perpendicular to the substantially conical outer profile.

Example 16 may include the method of Example 15, wherein providing the housing configuration includes arranging a plurality of segments in a stacked configuration.

Example 17 may include the method of Example 16, further including forming two or more of the plurality of segments with outer profiles that differ from one another.

Example 18 may include the method of Example 16, further including forming two or more of the plurality of segments with asymmetrical outer profiles.

Example 19 may include the method of Example 16, wherein positioning the one or more charge coils within the housing configuration includes providing at least one of the plurality of segments with a substantially planar charge coil that defines a charge field direction that is parallel to a longitudinal axis of the substantially conical outer profile.

Example 20 may include the method of Example 16, wherein providing the housing configuration further includes forming at least one of the plurality of segments with surfaces defining one or more inlet passages.

Example 21 may include the method of Example 20, wherein providing the housing configuration further includes forming a smallest end segment with surfaces defining one or more outlet passages.

Example 22 may include the method of Example 15, wherein one or more of the plurality of segments includes a first rim and a second rim that is larger than the first rim, and wherein the method further includes positioning a charge status indicator along a perimeter of one or more of the second rim, the first rim or a middle portion between the first rim and the second rim.

Example 23 may include the method of any one of Examples 15 to 22, further including coupling one or more flexible substrates to the one or more charge coils, and forming the one or more flexible substrates into a substantially conical shape.

Example 24 may include a wireless charging system comprising a charge circuit, a housing configuration including a substantially conical outer profile, and perpendicular field means for defining a charge field direction that is perpendicular to the substantially conical outer profile, wherein the perpendicular field means is positioned within the housing and coupled to the charge circuit.

Example 25 may include the system of Example 24, wherein the housing configuration includes a plurality of segments arranged in a stacked configuration.

Example 26 may include the system of Example 25, wherein two or more of the plurality of segments include outer profiles that differ from one another.

Example 27 may include the system of Example 25, wherein two or more of the plurality of segments include asymmetrical outer profiles.

Example 28 may include the system of Example 25, wherein at least one of the plurality of segments includes parallel field means for defining a charge field direction that is parallel to a longitudinal axis of the substantially conical outer profile.

Example 29 may include the system of Example 25, wherein at least one of the plurality of segments includes surfaces defining one or more inlet passages.

Example 30 may include the system of Example 29, wherein the plurality of segments includes a smallest end segment having surfaces defining one or more outlet passages.

Example 31 may include the system of Example 25, wherein one or more of the plurality of segments includes a first rim, a second rim that is larger than the first rim, and a charge status indicator positioned along a perimeter of one or more of the second rim, the first rim or a middle portion between the first rim and the second rim.

Example 32 may include the system of any one of Examples 24 to 31, further including one or more flexible substrates coupled to the one or more charge coils, wherein the one or more flexible substrates have a substantially conical shape.

Thus, techniques described herein may enhance charging efficiency, achieve better passive cooling, facilitate improved viewing of wearable device notifications during charging, and significantly reduce the charging footprint. Indeed, receiver coils in various sizes and shapes of wearable devices may couple more effectively and achieve optimal power transfer using the techniques described herein.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of B or C" may mean A, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   a charge circuit;
   a housing configuration including a substantially conical outer profile defined by a plurality of individual segments arranged in a substantially vertically stacked configuration along a longitudinal axis of the substantially conical outer profile, wherein two or more of the plurality of segments include asymmetrical outer profiles that differ from one another; and
   one or more charge coils positioned within the housing configuration and coupled to the charge circuit, the one or more charge coils conforming to the substantially conical outer profile to define a charge field direction that is perpendicular to the substantially conical outer profile, wherein at least one of the plurality of segments includes a substantially planar charge coil defining a charge field direction that is parallel to the longitudinal axis of the substantially conical outer profile.

2. The system of claim 1, wherein at least one of the plurality of segments includes a bottom surface defining one or more inlet passages to facilitate flow of ambient air into the housing configuration.

3. The system of claim 2, wherein the plurality of segments includes a smallest end segment having an upper surface defining one or more outlet passages to facilitate exit of exhaust airflow from the housing configuration due to natural convection.

4. The system of claim 1, wherein one or more of the plurality of segments includes:
   a first rim;
   a second rim that is larger than the first rim; and
   a charge status indicator positioned along a perimeter of one or more of the second rim, the first rim or a middle portion between the first rim and the second rim.

5. The system of claim 1, further including one or more flexible substrates coupled to the one or more charge coils, wherein the one or more flexible substrates have a substantially conical shape.

6. A system comprising:
   a charge circuit;
   a housing configuration including a substantially conical outer profile defined by a plurality of individual segments arranged in a substantially vertically stacked configuration along a longitudinal axis of the substantially conical outer profile; and
   one or more charge coils positioned within the housing configuration and coupled to the charge circuit, the one or more charge coils conforming to the substantially conical outer profile to define a charge field direction that is perpendicular to the substantially conical outer profile.

7. The system of claim 6, wherein two or more of the plurality of segments include outer profiles that differ from one another.

8. The system of claim 6, wherein two or more of the plurality of segments include asymmetrical outer profiles.

9. The system of claim 6, wherein at least one of the plurality of segments includes a substantially planar charge coil defining a charge field direction that is parallel to the longitudinal axis of the substantially conical outer profile.

10. The system of claim 6, wherein at least one of the plurality of segments includes a bottom surface defining one or more inlet passages to facilitate flow of ambient air into the housing configuration.

11. The system of claim 10, wherein the plurality of segments includes a smallest end segment having an upper surface surfaces defining one or more outlet passages to facilitate exit of exhaust airflow from the housing configuration due to natural convection.

12. The system of claim 6, wherein one or more of the plurality of segments includes:
    a first rim;
    a second rim that is larger than the first rim; and
    a charge status indicator positioned along a perimeter of one or more of the second rim, the first rim or a middle portion between the first rim and the second rim.

13. The system of claim 6, further including one or more flexible substrates coupled to the one or more charge coils, wherein the one or more flexible substrates have a substantially conical shape.

14. A method comprising:
    providing a charge circuit;
    providing a housing configuration including a substantially conical outer profile defined by a plurality of individual segments arranged in a substantially vertically stacked configuration;
    positioning one or more charge coils within the housing configuration; and
    coupling the one or more charge coils to the charge circuit, wherein the one or more charge coils conform to the substantially conical outer profile to define a charge field direction that is perpendicular to a longitudinal axis of the substantially conical outer profile.

15. The method of claim 14, further including forming two or more of the plurality of segments with outer profiles that differ from one another.

16. The method of claim 14, further including forming two or more of the plurality of segments with asymmetrical outer profiles.

17. The method of claim 14, wherein positioning the one or more charge coils within the housing configuration includes providing at least one of the plurality of segments with a substantially planar charge coil that defines a charge field direction that is parallel to the longitudinal axis of the substantially conical outer profile.

18. The method of claim 14, wherein providing the housing configuration further includes forming at least one of the plurality of segments with a bottom surface defining one or more inlet passages to facilitate flow of ambient air into the housing configuration.

19. The method of claim 18, wherein providing the housing configuration further includes forming a smallest end segment with an upper surface defining one or more outlet passages to facilitate exit of exhaust airflow from the housing configuration due to natural convection.

20. The method of claim 14, wherein one or more of the plurality of segments includes a first rim and a second rim that is larger than the first rim, and wherein the method further includes positioning a charge status indicator along a perimeter of one or more of the second rim, the first rim or a middle portion between the first rim and the second rim.

21. The method of claim 14, further including:
coupling one or more flexible substrates to the one or more charge coils; and
forming the one or more flexible substrates into a substantially conical shape.

* * * * *